(No Model.)
K. R. JOHNSON.
CULTIVATOR OR PLOW GUIDE.
No. 512,301. Patented Jan. 9, 1894.
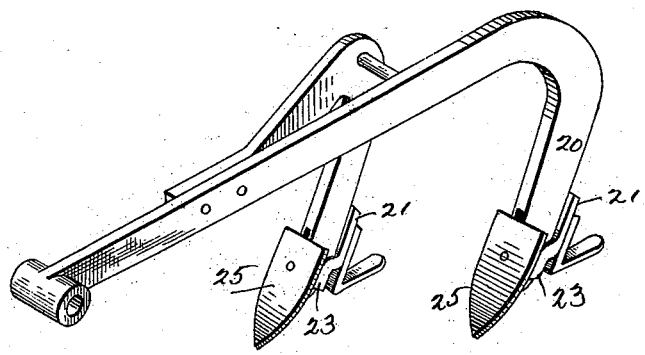
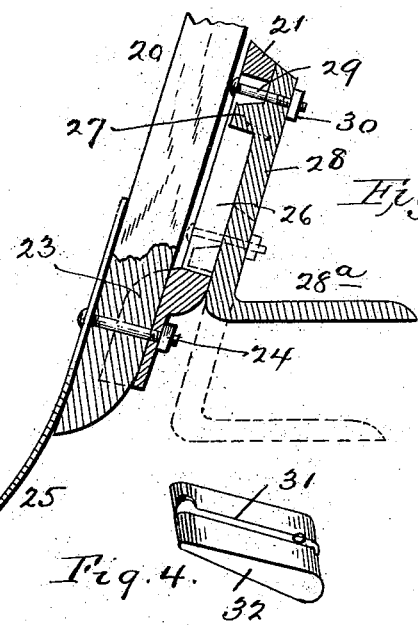
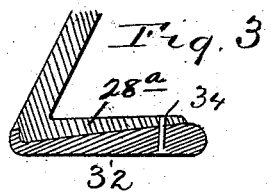
WITNESSES
F. L. Ourand
Benj. S. Cowl
INVENTOR
KENNETH R. JOHNSON.
By J. L. Coombs
Attorney

UNITED STATES PATENT OFFICE.

KENNETH R. JOHNSON, OF FRANKLIN, VIRGINIA.

CULTIVATOR OR PLOW GUIDE.

SPECIFICATION forming part of Letters Patent No. 512,301, dated January 9, 1894.

Application filed May 16, 1893. Serial No. 474,439. (No model.)

*To all whom it may concern:*

Be it known that I, KENNETH R. JOHNSON, a citizen of the United States, residing at Franklin, in the county of Southampton and State of Virginia, have invented certain new and useful Improvements in Cultivator or Plow Guides; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in guides or gages for cultivators and plows, and its object is to provide an adjustable guide, adapted to travel in the furrow made by a cultivator or plow, and thus serve to guide and steady the implement while at work.

The invention consists in the novel construction and combination of parts hereinafter described and claimed.

In the accompanying drawings, Figure 1 is a perspective view of a cultivator with my improvement applied thereto. Fig. 2 is a sectional view on an enlarged scale. Fig. 3 is a similar view of the adjustable guide showing a modification in the construction thereof. Fig. 4 is a perspective view of the shoe detached from the guide.

In the said drawings, the reference numeral 20, designates the standard of a cultivator which may be of any ordinary or suitable construction, and 21 denotes a plate having forwardly extending flanges 23, at its lower end, which embrace the lower end of the standard 1. A bolt 24 secures this plate to the standard and also secures the shovel 25, in place. The said plate 21 is formed with a slot 26 to receive a stud 27, on the guide 28, having a rearwardly extending portion 28$^a$ which forms the gage or guide. A bolt 29 and nut 30, secure the guide in place.

In Figs. 3 and 4, I have shown a slight modification in the construction of the guide. In this modification a longitudinal groove is formed in the under side of the rearwardly extending portion 28$^a$, with which engages a rib 31, on the upper side of a removable shoe 32. This shoe is secured to the guide by a bolt 34. The object of this shoe is that when worn out it may be replaced by a new one.

The operation will be readily understood. The guide is vertically adjustable upon the plate secured to the standard, and it travels in the furrow formed by the shovel, and guides the implement in its work.

Having thus described my invention, what I claim is—

1. A cultivator or plow guide comprising the vertical slotted plate having forwardly extending flanges at its lower end adapted to embrace the lower sides of a cultivator or plow standard, of the guide having a stud seated in said slot and a rearwardly extending portion and the screw bolt and nut for securing said guide adjustably to said plate, substantially as described.

2. The combination with the slotted plate having forwardly extending flanges adapted to embrace a cultivator or plow standard, of the vertically adjustable guide having a stud seated in said slot, and a rearwardly extending portion formed with a longitudinal groove on its under side, the shoe having a rib engaging with said groove, and the bolt for securing said shoe to the guide, substantially as described.

In testimony whereof I affix my signature in presence of two witnesses.

KENNETH R. JOHNSON.

Witnesses:
    JOS. L. COOMBS,
    BENJ. G. COWL.